United States Patent
Okuyama et al.

(10) Patent No.: US 8,981,241 B2
(45) Date of Patent: Mar. 17, 2015

(54) CABLE HOLDING STRUCTURE

(71) Applicant: Hitachi Cable, Ltd., Tokyo (JP)

(72) Inventors: Ken Okuyama, Hitachi (JP); Takahiro Futatsumori, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 52 days.

(21) Appl. No.: 13/788,752

(22) Filed: Mar. 7, 2013

(65) Prior Publication Data

US 2013/0233616 A1 Sep. 12, 2013

(30) Foreign Application Priority Data

Mar. 12, 2012 (JP) ................................. 2012-054078

(51) Int. Cl.
*H02G 3/18* (2006.01)
*H02G 15/007* (2006.01)

(52) U.S. Cl.
CPC .................................. *H02G 15/007* (2013.01)
USPC .......... 174/659; 174/168; 174/71 R; 174/652; 439/501; 277/606

(58) Field of Classification Search
USPC .............................. 403/390; 439/501; 277/606
See application file for complete search history.

(56) References Cited

U.S. PATENT DOCUMENTS

| | | | |
|---|---|---|---|
| 4,382,653 A * | 5/1983 | Blanchard | ................. 439/607.41 |
| 6,595,789 B2 | 7/2003 | Oota et al. | |
| 6,814,617 B2 | 11/2004 | Oota et al. | |
| 2002/0048994 A1 | 4/2002 | Oota et al. | |
| 2003/0207615 A1 | 11/2003 | Oota et al. | |
| 2008/0113559 A1 | 5/2008 | Hamai et al. | |

FOREIGN PATENT DOCUMENTS

| | | |
|---|---|---|
| JP | H09-180825 A | 7/1997 |
| JP | B2-3819229 | 6/2006 |
| JP | 2008-125200 A | 5/2008 |

OTHER PUBLICATIONS

Japanese Official Action dated Nov. 18, 2014 from related JP 2012-054078 together with English language translation.

* cited by examiner

*Primary Examiner* — Dhirubhai R Patel

(74) *Attorney, Agent, or Firm* — Scully, Scott, Murphy & Presser, PC

(57) ABSTRACT

A cable holding structure includes a plate-shaped member having an opening, and a conductive wire holding portion holding a plurality of wires inserted therethrough, the wire holding portion being disposed in the opening and electrically connected to a braided shield that collectively covers the plurality of wires. The wire holding portion protrudes from the opening of the plate-shaped member and includes a plurality of through-holes extending in a direction orthogonal to the plate-shaped member. The plurality of wires are each enclosed in the through-holes. The braided shield is electrically connected to an outer surface of the wire holding portion protruding from the opening.

8 Claims, 4 Drawing Sheets

| 20 PLATE-SHAPED MEMBER |
| 21 WIRE HOLDING PORTION |

CABLE HOLDING STRUCTURE

The present application is based on Japanese patent application No. 2012-054078 filed on Mar. 12, 2012, the entire contents of which are incorporated herein by reference.

BACKGROUND OF THE INVENTION

1. Field of the Invention

The invention relates to a cable holding structure and, in particular, to a cable holding structure for holding a shielded cable with a braided shield collectively covering plural wires.

2. Description of the Related Art

A connection structure is known that is composed of plural wires, a braided shield for collectively shielding the plural wires, an electric wire holder for holding the plural wires at predetermined intervals and a conductive casing housing the electric wire holder and connected to the braided shield, wherein the plural wires are connected to an electronic unit in a housing via a terminal fitting (see, e.g., Japanese patent No. 3819229).

In the connection structure disclosed in Japanese patent No. 3819229, the conductive casing is composed of a main body covering ends of the plural wires in a region from an end portion of the braided shield to the housing, and a lug to be fixed to an outer surface of the housing. By fixing the lug to the outer surface of the housing, the housing can be electrically connected to the casing and the braided shield.

SUMMARY OF THE INVENTION

In connecting the shielded cable with the plural wires and the braided shield to complete the connection structure, sequential processes have to be conducted that include holding the plural wires by the electric wire holder, enclosing the electric wire holder with the plural wire held thereby into the casing and connecting the braided shield to the casing. Thus, they impede the improvement of work efficiency to be attained by reducing the assembly man-hours.

Accordingly, it is an object of the invention to provide a cable holding structure that can reduce the assembly man-hours as compared to the case where the braided shield is connected via the conductive casing.

(1) According to one embodiment of the invention, a cable holding structure comprises:

a plate-shaped member having an opening; and a conductive wire holding portion holding a plurality of wires inserted therethrough, the wire holding portion being disposed in the opening and electrically connected to a braided shield that collectively covers the plurality of wires, wherein the wire holding portion protrudes from the opening of the plate-shaped member and comprises a plurality of through-holes extending in a direction orthogonal to the plate-shaped member, wherein the plurality of wires are each enclosed in the through-holes, and wherein the braided shield is electrically connected to an outer surface of the wire holding portion protruding from the opening.

In the above embodiment (1) of the invention, the following modifications and changes can be made.

(i) The braided shield is pressed against the outer surface of the wire holding portion by an annular fastening member that is disposed so as to sandwich the braided shield between the wire holding portion and the fastening member.

(ii) Outer peripheral openings for opening the through-holes to the outside in a radial direction are formed on the wire holding portion along the through-holes, wherein outer peripheral surfaces of the wires are partially exposed to outside of the through-holes from the outer peripheral openings, and wherein the outer peripheral surfaces of the wires exposed from the outer peripheral openings are subjected to a fastening force from the fastening member via the braided shield.

(iii) The wire holding portion comprises a columnar member having a plurality of walls that are formed radially so as to separate the plurality of through-holes.

(iv) The plate-shaped member is conductive, wherein the wire holding portion is disposed in the opening of the plate-shaped member to be electrically connected to the plate-shaped member and the brained shield.

(v) The plate-shaped member is a part of a housing of a device.

Effects of the Invention

According to one embodiment of the invention, a cable holding structure can be provided that can reduce the assembly man-hours as compared to the case where the braided shield is connected via the conductive casing.

BRIEF DESCRIPTION OF THE DRAWINGS

Next, the present invention will be explained in more detail in conjunction with appended drawings, wherein:

FIGS. 1A and 1B are perspective views showing a cable holding structure in a first embodiment of the present invention, wherein FIG. 1A shows a state before a shielded cable is held by a connection panel and FIG. 1B shows a state in which the shielded cable is held by the connection panel;

DETAILED DESCRIPTION OF THE PREFERRED EMBODIMENTS

First Embodiment

A configuration example of a cable holding structure in the first embodiment of the invention will be described in reference to FIGS. 1 and 2.

Figure 1A:
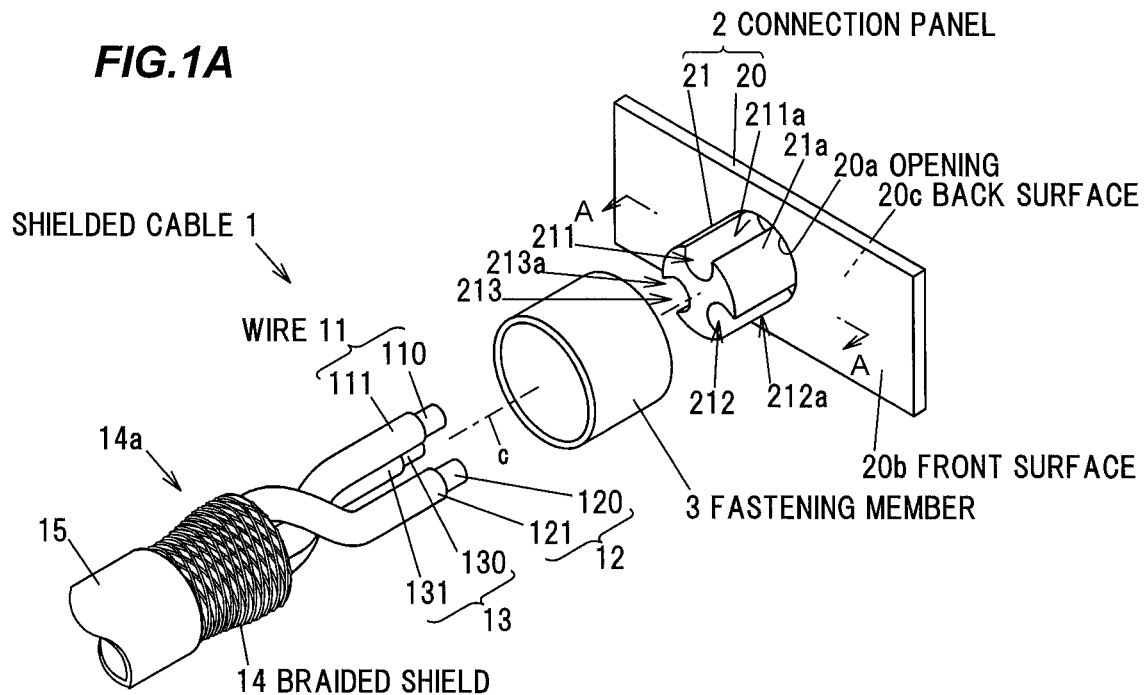
Figure 1B:
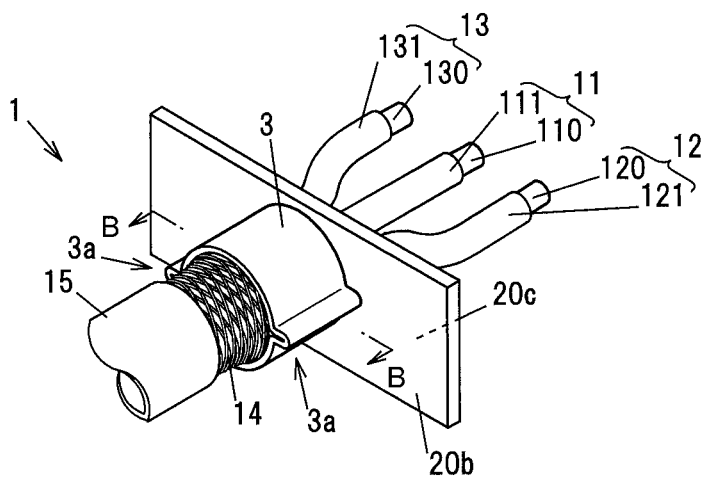
Figure 2A:
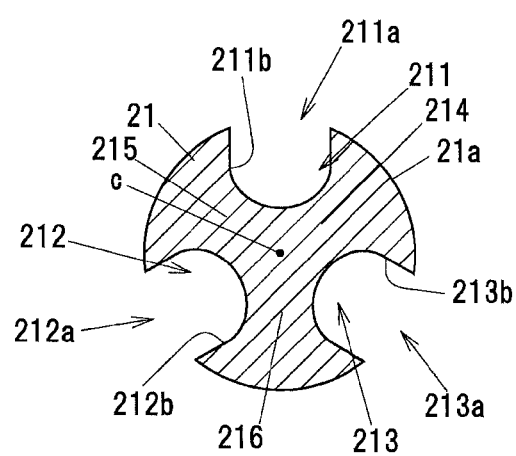
FIG. 2A is a cross sectional view taken on line A-A of FIG. 1A.
Figure 2B:
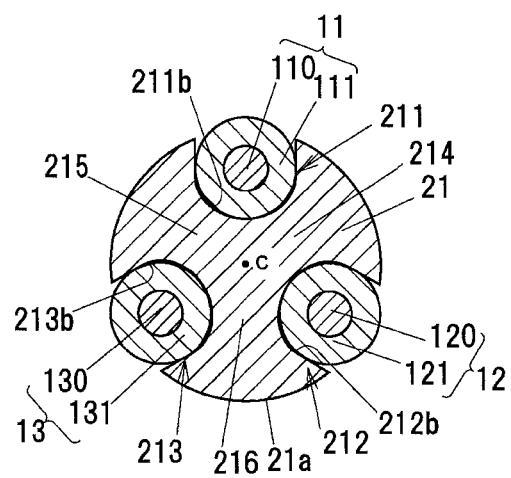
FIG. 2B is a cross sectional view showing a state before FIG. 2C in which a fastening member is not crimped and fixed yet.
Figure 2C:
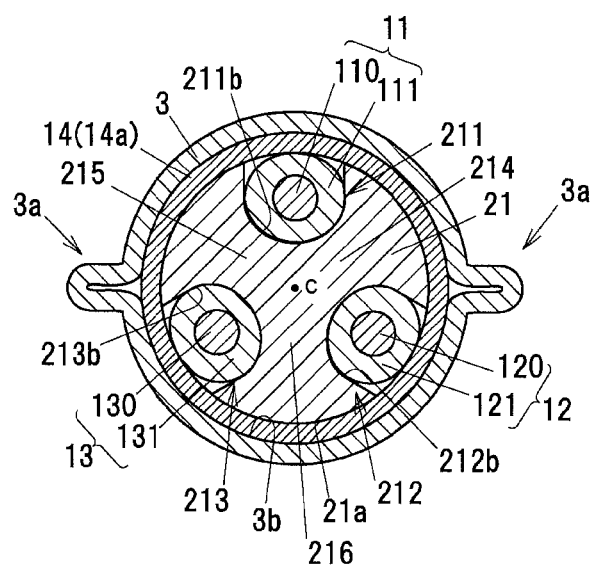
FIG. 2C is a cross sectional view taken on line B-B of FIG. 1B

FIGS. 1A and 1B are perspective views showing a cable holding structure in the first embodiment of the invention, wherein FIG. 1A shows a state before a shielded cable 1 is held by a connection panel 2 and FIG. 1B shows a state in which the shielded cable 1 is held by the connection panel 2. FIG. 2A is a cross sectional view taken on line A-A of FIG. 1A, FIG. 2C is a cross sectional view taken on line B-B of FIG. 1B and FIG. 2B is a cross sectional view showing a state before FIG. 2C in which a fastening member 3 is not crimped and fixed yet.

The shielded cable 1 is composed of three wires 11, 12 and 13, a braided shield 14 covering the three wires 11, 12 and 13 all together, and a sheath 15 covering an outer periphery of the braided shield 14.

The wire 11 is composed of a center conductor 110 and an insulation 111 covering an outer periphery of the center conductor 110. Likewise, the wires 12 and 13 are formed by respectively covering outer peripheries of center conductors 120 and 130 with insulations 121 and 131. The center conductors 110, 120, 130 and the braided shield 14 are formed of a conductive metal such as copper or aluminum, and the insulations 111, 121 and 131 and the sheath 15 are formed of an insulating resin.

The connection panel 2 is composed of a plate-shaped member 20 formed in a flat-plate shape and a wire holding portion 21 which is a columnar member. The wire holding portion 21 is provided in an opening 20a of the plate-shaped member 20 and partially protrudes from the opening 20a. The plate-shaped member 20 and the wire holding portion 21 are both formed of a conductive metal such as iron. In the first embodiment, the plate-shaped member 20 and the wire holding portion 21 are separate parts and the wire holding portion 21 is press-fitted into and fixed to the circular opening 20a formed on the plate-shaped member 20. Alternatively, the plate-shaped member 20 and the wire holding portion 21 may be formed integrally.

For example, a bolt (not shown) is inserted into an insertion hole (not shown) formed on the connection panel 2 and is screwed into a bolt hole formed on a case (not shown) of a device such as inverter, thereby connecting the connection panel 2 to the case. Note that, the connection panel 2 may be a portion of a housing of a connector or a device.

In more detail, the plate-shaped member 20 is attached to a case of, e.g., an inverter supplying three-phase alternating current to a motor as a drive source of a vehicle and is electrically grounded through the case. Meanwhile, the wires 11, 12 and 13 are connected to, e.g., a terminal block inside the case and supply three-phase alternating current generated by PWM control to the motor.

Three through-holes 211, 212 and 213 are formed on the wire holding portion 21 along a central axis c thereof. In the first embodiment, the wire holding portion 21 is fixed so that the central axis c orthogonally crosses a front surface 20b of the plate-shaped member 20. Accordingly, the through-holes 211, 212 and 213 extend in a direction orthogonally crossing the front surface 20b of the plate-shaped member 20.

The three through-holes 211, 212 and 213 are formed at equal intervals in a circumferential direction about the central axis c of the wire holding portion 21. In addition, the three through-holes 211, 212 and 213 penetrate the plate-shaped member 20 in a thickness direction thereof, are open to the front surface 20b side of the plate-shaped member 20 at one end in an extending direction thereof and are open to a back surface 20c side of the plate-shaped member 20 at another end.

As shown in FIG. 2A, the through-holes 211 and 213 are separated by a wall 214, the through-holes 212 and 211 are separated by a wall 215, and the through-holes 213 and 212 are separated by a wall 216. The walls 214, 215 and 216 each have a sector shape having a width increasing toward the outer periphery of the wire holding portion 21, and are formed radially centering around the central axis c of the wire holding portion 21.

In addition, an outer peripheral opening 211a for opening the through-hole 211 to the outside in a radial direction thereof, an outer peripheral opening 212a for opening the through-hole 212 to the outside in a radial direction thereof and an outer peripheral opening 213a for opening the through-hole 213 to the outside in a radial direction thereof are formed on the wire holding portion 21. The outer peripheral openings 211a, 212a and 213a are formed along the through-holes 211, 212 and 213 over the entire length thereof. In other words, on the wire holding portion 21, three grooves (corresponding to the through-holes 211, 212 and 213) having a depth in a radial direction from the outer peripheral openings 211a, 212a and 213a formed on an outer peripheral surface 21a toward the central axis c are formed parallel to the central axis c.

At one end of the shielded cable 1 to be held by the connection panel 2, the sheath 15 is removed over the length of the wire holding portion 21 or longer in the direction of the central axis c, and the portions of the wires 11, 12 and 13 without the sheath 15 are respectively received in the through-holes 211, 212 and 213 of the wire holding portion 21. In more detail, as shown in FIGS. 2B and 2C, the wire 11 is received in the through-hole 211, the wire 12 is received in the through-hole 212 and the wire 13 is received in the through-hole 213.

At tip portions of the wires 11, 12 and 13, the insulations 111, 121 and 131 are removed and the center conductors 110, 120 and 130 are exposed. A non-illustrated terminal fitting is crimped to each tip portion of the exposed center conductors 110, 120 and 130, and is connected to a non-illustrated terminal block on the back surface 20c side of the plate-shaped member 20.

The braided shield 14 is exposed to the outside at a portion in which the sheath 15 is removed, and an inner diameter of the braided shield 14 is enlarged in a predetermined region on the front end side. In the following description, a portion of the braided shield 14 in which the inner diameter thereof is enlarged is defined as an expanded portion 14a. The expanded portion 14a is formed to have an inner diameter larger than an outer diameter of the wire holding portion 21. It is possible to form the expanded portion 14a by, e.g., pushing and stretching the braided shield 14 from the inner side thereof.

As shown in FIGS. 1B and 2C, the expanded portion 14a is arranged so as to cover the outer periphery of the wire holding portion 21 and is pressed against the outer surface 21a of the wire holding portion 21 by the annular fastening member 3. In other words, the expanded portion 14a comes into contact with the outer surface 21a of the wire holding portion 21 by a fastening force of the fastening member 3, and the braided shield 14 is thereby electrically connected to the wire holding portion 21.

The fastening member 3 is formed of, e.g., a metal such as iron and is arranged so that the braided shield 14 is sandwiched between itself and the wire holding portion 21. The fastening member 3 is crimped so that an inner diameter thereof is reduced, and the expanded portion 14a of the braided shield 14 is thereby pressed toward the outer surface 21a of the wire holding portion 21. Protruding portions 3a which protrude outward are formed at two circumferential positions by the crimping.

In addition, the fastening member 3 presses the wires 11, 12 and 13 toward the inmost portions of the through-holes 211, 212 and 213 (toward the center of the wire holding portion 21) by the fastening force and movement of the wires 11, 12 and 13 in an axial direction is restricted by a force of friction against inner surfaces 211b, 212b and 213b of the through-holes 211, 212 and 213. In other words, the outer peripheral surfaces of the wires 11, 12 and 13 are partially exposed to the outside of the through-holes 211, 212 and 213 from the outer peripheral openings 211a, 212a and 213a, and the outer peripheral surfaces of the wires 11, 12 and 13 exposed from the outer peripheral openings 211a, 212a and 213a receive the fastening force of the fastening member 3 via the expanded portion 14a of the braided shield 14.

Assembly Process of the Cable Holding Structure

Next, an assembly process of the cable holding structure in which the shielded cable 1 is held by the wire holding portion 21 will be described.

The assembly process includes a first step of processing one end of the shielded cable 1, a second step of inserting the wires 11, 12 and 13 into the through-holes 211, 212 and 213 of the wire holding portion 21, and a third step of crimping the fastening member 3. Note that, the wire holding portion 21 is preliminarily fixed to the opening 20a of the plate-shaped member 20.

In the first step, the sheath 15 is removed over a predetermined length at an end portion of the shielded cable 1, and then, the braided shield 14 exposed thereby is partially removed on the front end side. Next, an inner diameter of the non-removed portion of the braided shield 14 exposed from the sheath 15 is enlarged at an end portion to form the expanded portion 14a. Furthermore, the insulations 111, 121 and 131 are removed at the tip portions of the wires 11, 12 and 13 to expose the center conductors 110, 120 and 130.

In the second step, the wires 11, 12 and 13 are inserted into the through-holes 211, 212 and 213 of the wire holding portion 21 along the central axis c of the wire holding portion 21 so that the tip portions (portions in which the insulations 111, 121 and 131 are removed) of the wires 11, 12 and 13 pass therethrough from the front surface 20b side to the back surface 20c side of the plate-shaped member 20. At this stage, the wires 11, 12 and 13 partially protrude from the through-holes 211, 212 and 213, as shown in FIG. 2B. In addition, in accordance with the insertion of the wires 11, 12 and 13 into the through-holes 211, 212 and 213, the expanded portion 14a of the braided shield 14 is arranged on the outer surface 21a of the wire holding portion 21.

In the third step, the fastening member 3 preliminarily fitted to the shielded cable 1 is moved onto the outer periphery of the expanded portion 14a of the braided shield 14, and is crimped. The fastening force of the fastening member 3 by the crimping presses the expanded portion 14a of the braided shield 14 against the outer surface 21a of the wire holding portion 21 and also the wires 11, 12 and 13 protruding from the through-holes 211, 212 and 213 toward the center of the wire holding portion 21, as shown in FIG. 2C. As a result, the braided shield 14 is electrically connected to the wire holding portion 21 and the wires 11, 12 and 13 are held by the wire holding portion 21.

Functions and Effects of the First Embodiment

The following functions and effects are obtained in the first embodiment.

(1) Since the braided shield 14 is directly in contact with and electrically connected to the outer surface 21a of the wire holding portion 21, it is possible to reduce man-hours for the assembly process as compared to the case where, e.g., the braided shield 14 is connected to the wire holding portion 21 via a conductive member such as a casing.

(2) The braided shield 14 is pressed against the outer surface 21a of the wire holding portion 21 by the fastening force of the fastening member 3 arranged on the outer periphery of the expanded portion 14a. That is, since the expanded portion 14a of the braided shield 14 comes into contact with the outer surface 21a of the wire holding portion 21 entirely in a circumferential direction, it is possible to increase a contact area between the braided shield 14 and the wire holding portion 21, which allows electrical resistance therebetween to be reduced.

(3) Since the outer peripheral surfaces of the wires 11, 12 and 13 exposed from the outer peripheral openings 211a, 212a, 213a receive the fastening force of the fastening member 3 via the expanded portion 14a of the braided shield 14 and the wires 11, 12 and 13 are pressed toward the inmost portions of the through-holes 211, 212 and 213, the wires 11, 12 and 13 are held in the through-holes 211, 212 and 213 by a force of friction between the wires 11, 12, 13 and the inner surfaces 211b, 212b, 213b of the through-holes 211, 212 and 213. This suppresses the movement of the wires 11, 12 and 13 in the axial direction even if, e.g., the wires 11, 12 and 13 are pulled by an external force in a direction of coming off from through-holes 211, 212 and 213.

(4) Since the wire holding portion 21 is formed in a columnar shape and the through-holes 211, 212 and 213 are separated by the walls 214, 215 and 216 which are formed radially, it is possible to shorten each distance between the wires 11, 12 and 13 on the wire holding portion 21. Since this eliminates the necessity of increasing a size of the expanded portion 14a of the braided shield 14, it is possible to suppress generation of noise from the wires 11, 12 and 13. In addition, the fastening force of the fastening member 3 equally acts on the wires 11, 12 and 13 and it is thus possible to more surely suppress the movement of the wires 11, 12 and 13 in the axial direction.

Second Embodiment

Next, the second embodiment of the invention will be described in reference to FIGS. 3 and 4.

Figure 3:
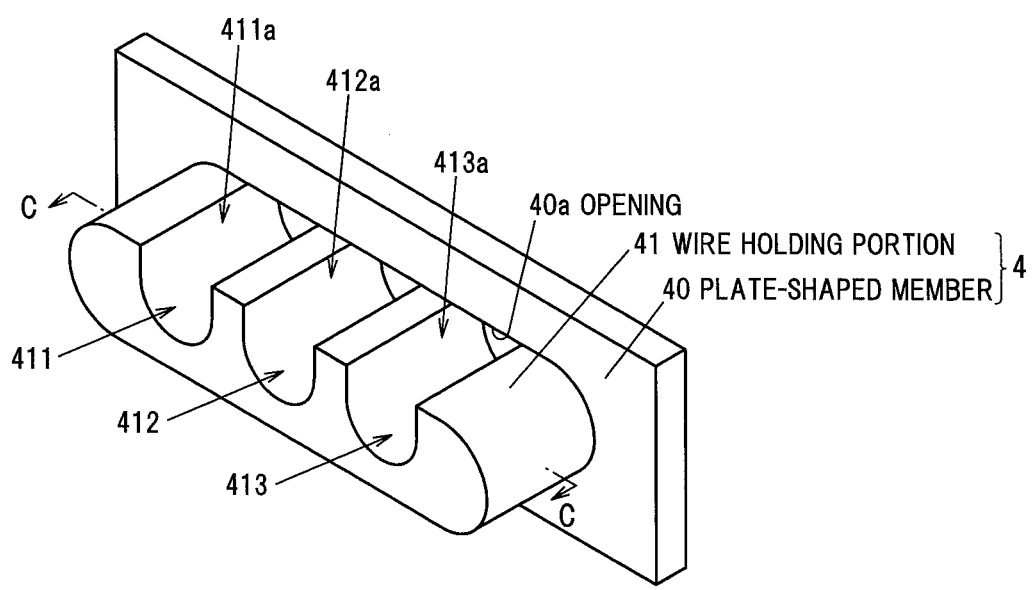
FIG. 3 is a perspective view showing a wire holding portion in a second embodiment of the invention.
Figure 4A:
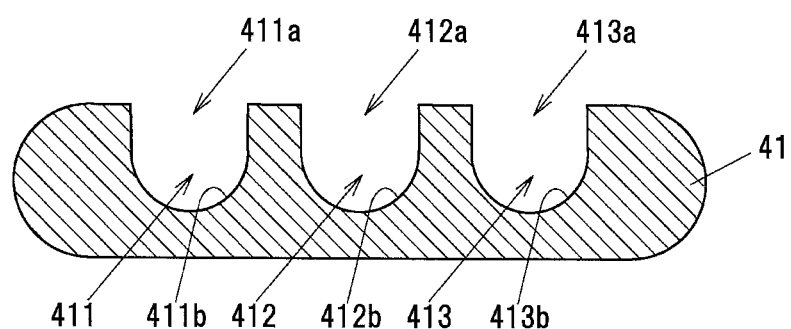
FIG. 4A is a cross sectional view taken on line C-C of FIG. 3
Figure 4B:
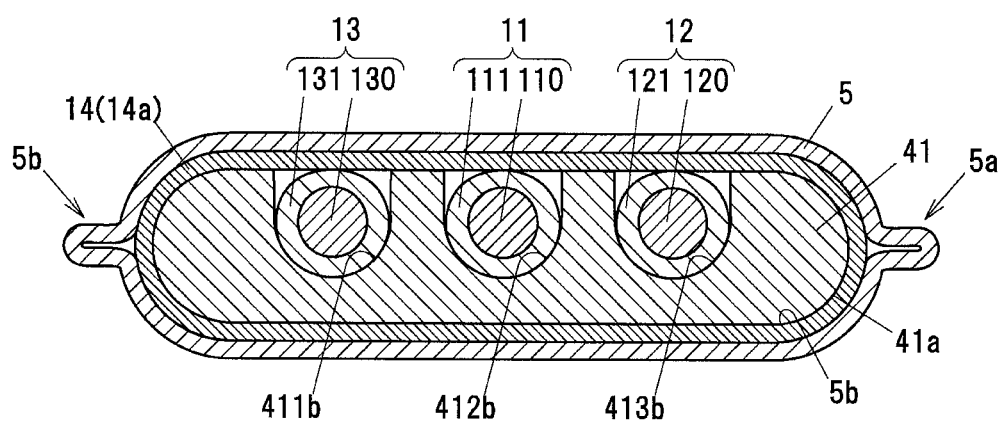
FIG. 4B is a cross sectional view showing a state in which wires are held in the wire holding portion of FIG. 4A.

FIG. 3 is a perspective view showing a wire holding portion 41 in a second embodiment of the invention. FIG. 4A is a cross sectional view taken on line C-C of FIG. 3. FIG. 4B is a cross sectional view showing a state in which the wires 11, 12 and 13 are held in the wire holding portion 41 of FIG. 4A.

In the connection panel 4 in the second embodiment, a rounded-rectangle-shaped opening 40a is formed on a plate-shaped member 40 having a flat-plate shape, and the wire holding portion 41 also formed in a rounded-rectangle shape so as to correspond to the opening 40a is press-fitted into and fixed to the opening 40a, as shown in FIG. 3.

Three through-holes 411, 412 and 413 extending in a direction crossing the plate-shaped member 40 are formed on the wire holding portion 41 so as to be aligned in one direction. In the second embodiment, the through-holes 411, 412 and 413 are formed along a direction orthogonal to the plate-shaped member 40 so as to be parallel to each other.

In addition, as shown in FIG. 4A, an outer peripheral opening 411a for opening the through-hole 411 to the outside in a radial direction thereof; an outer peripheral opening 412a for opening the through-hole 412 to the outside in a radial direction thereof and an outer peripheral opening 413a for opening the through-hole 413 to the outside in a radial direction thereof are formed on the wire holding portion 41. The outer peripheral openings 411a, 412a and 413a are formed along the through-holes 411, 412 and 413 over the entire length thereof.

As shown in FIG. 4B, the through-holes 411, 412 and 413 respectively receive the wires 11, 12 and 13. Meanwhile, the expanded portion 14a of the braided shield 14 is arranged so as to surround an outer surface 41a of the wire holding portion 41 and is pressed against and in contact with the outer surface 41a of the wire holding portion 41 by an annular fastening member 5. A pair of protruding portions 5a is formed on the fastening member 5 by the crimping.

In addition, the outer peripheral surfaces of the wires 11, 12 and 13 exposed from the outer peripheral openings 411a, 412a and 413a of the through-holes 411, 412 and 413 receive a fastening force of the fastening member 5 via the braided shield 14 (the expanded portion 14a), and the wires 11, 12 and 13 are pressed against inner surfaces 411b, 412b and 413b of the through-holes 411, 412 and 413. The movement of the wires 11, 12 and 13 in the axial direction is restricted by a force of friction between the wires 11, 12 and 13 and the inner surfaces 411*b*, 412*b* and 413*b* of the through-holes 411, 412 and 413.

Functions and Effects of the Second Embodiment

The second embodiment achieves the same functions and effects as (1) to (3) described in the first embodiment. In addition, it is possible to reduce the size of the wire holding portion 41 in a thickness direction (a vertical direction in FIG. 4).

Although the embodiments of the invention have been described, the invention according to claims is not to be limited to the above-mentioned embodiments. Further, please note that all combinations of the features described in the embodiments are not necessary to solve the problem of the invention.

In addition, appropriately modifications can be implemented without departing the gist of the invention. For example, although the case where the number of wires is three has been described in the first and second embodiments, the number of wires is not limited and the cable holding structure of the invention is applicable to a shielded cable having one or two wires or four or more wires. In addition, the intended use of the shielded cable is not specifically limited, neither.

In addition, the cable holding structure of the invention is applicable to products other than the above-mentioned shielded cable. It is possible to apply to, e.g., a harness having a metal pipe housing plural wires all together and a braided shield which is connected to the metal pipe so that the plural wires exposed from the metal pipe are covered all together.

What is claimed is:

1. A cable holding structure, comprising:
a plate-shaped member having an opening; and
a conductive wire holding portion holding a plurality of wires inserted therethrough, the wire holding portion being disposed in the opening and electrically connected to a braided shield that collectively covers the plurality of wires,
wherein the wire holding portion protrudes from the opening of the plate-shaped member and comprises a plurality of through-openings extending in a direction orthogonal to the plate-shaped member,
wherein the plurality of wires are each enclosed in the through-openings, and
wherein the braided shield covers an outer surface of the wire holding portion protruding from the opening of the plate-shaped member.

2. The cable holding structure according to claim 1, wherein the braided shield is pressed against the outer surface of the wire holding portion by an annular fastening member that is disposed so as to sandwich the braided shield between the wire holding portion and the fastening member.

3. The cable holding structure according to claim 2, wherein outer peripheral openings for opening the through-holes to the outside in a radial direction are formed on the wire holding portion along the through-holes,
wherein outer peripheral surfaces of the wires are partially exposed to outside of the through-holes from the outer peripheral openings, and
wherein the outer peripheral surfaces of the wires exposed from the outer peripheral openings are subjected to a fastening force from the fastening member via the braided shield.

4. The cable holding structure according to claim 1, wherein the wire holding portion comprises a columnar member having a plurality of walls that are formed radially so as to separate the plurality of through-holes.

5. The cable holding structure according to claim 1, wherein the plate-shaped member is conductive, and
wherein the wire holding portion is disposed in the opening of the plate-shaped member to be electrically connected to the plate-shaped member and the brained shield.

6. The cable holding structure according to claim 5, wherein the plate-shaped member is a part of a housing of a device.

7. The cable holding structure according to claim 1, wherein the wire holding portion holds the plurality of wires at predetermined intervals.

8. The cable holding structure according to claim 7, wherein the wire holding portion holds the plurality of wires at equal intervals.

* * * * *